United States Patent
Muenzel

(10) Patent No.: US 11,927,942 B2
(45) Date of Patent: Mar. 12, 2024

(54) AUTOMATIC SETUP OF DIGITAL TWINS FOR INDUSTRIAL CONTROLLERS

(71) Applicant: Siemens Aktiengesellschaft, Munich (DE)

(72) Inventor: Georg Muenzel, Waischenfeld (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 484 days.

(21) Appl. No.: 17/269,069

(22) PCT Filed: Aug. 23, 2018

(86) PCT No.: PCT/US2018/047733
§ 371 (c)(1),
(2) Date: Feb. 17, 2021

(87) PCT Pub. No.: WO2020/040772
PCT Pub. Date: Feb. 27, 2020

(65) Prior Publication Data
US 2021/0208576 A1 Jul. 8, 2021

(51) Int. Cl.
*G05B 19/418* (2006.01)
*G06K 19/06* (2006.01)
(Continued)

(52) U.S. Cl.
CPC . *G05B 19/41885* (2013.01); *G06K 19/06037* (2013.01); *H04L 63/0428* (2013.01); *G05B 2219/33286* (2013.01)

(58) Field of Classification Search
CPC .... G05B 19/41885; G05B 2219/33286; G05B 19/418; G05B 2219/31334;
(Continued)

(56) References Cited

U.S. PATENT DOCUMENTS 10,404,569 B2 * 9/2019 Hershey ............... H04L 43/067
10,803,213 B2 * 10/2020 Bhattacharyya ..... G01C 21/203
(Continued)

FOREIGN PATENT DOCUMENTS

WO    2018111368 A1    6/2018

OTHER PUBLICATIONS

PCT International Search Report and Written Opinion of International Searching Authority dated Jun. 7, 2019 corresponding to PCT International Application No. PCT/US2018/047733 filed Aug. 23, 2018.
(Continued)

*Primary Examiner* — Ramesh B Patel

(57) ABSTRACT

A method for implementing a digital twin for a physical component of an industrial system includes assigning a unique identifier to the physical component, associating the unique identifier with a digital twin representative of the physical component, placing the digital twin of the physical component on a distributed network. The physical component sends the unique identifier to a known resource, which retrieves the network address of the physical twin associated with the unique identifier and provides the network address to the physical component. A secure communication connection is established between the physical component and the corresponding digital twin via the distributed network. The unique identifier may be a quick read (QR) code displayed on the physical component or a bar code displayed on the physical component. Engineering and simulation software for the digital twin may be supplied on the distributed network.

14 Claims, 5 Drawing Sheets

(51) Int. Cl.
*H04L 9/40* (2022.01)
*H04L 29/06* (2006.01)

(58) Field of Classification Search
CPC .............. G05B 19/0426; G05B 19/056; G06K 19/06037; H04L 63/0428; Y02P 90/02
See application file for complete search history.

(56) References Cited

U.S. PATENT DOCUMENTS

| | | | | |
|---|---|---|---|---|
| 11,200,358 | B2* | 12/2021 | Bhattacharyya | G06F 30/20 |
| 11,204,597 | B2* | 12/2021 | Small | G06Q 20/065 |
| 11,539,658 | B2* | 12/2022 | Kodaypak | H04L 51/58 |
| 11,567,481 | B2* | 1/2023 | Davis | G05B 19/4099 |
| 11,631,060 | B2* | 4/2023 | Davis | G06N 5/02 |
| | | | | 705/305 |
| 11,669,085 | B2* | 6/2023 | Franke | G05B 23/0294 |
| | | | | 700/28 |
| 11,709,481 | B2* | 7/2023 | Sayyarrodsari | G05B 19/4183 |
| | | | | 700/108 |
| 2017/0286572 | A1 | 10/2017 | Hershey et al. | |
| 2017/0323274 | A1 | 11/2017 | Johnson et al. | |
| 2018/0054376 | A1* | 2/2018 | Hershey | H04L 43/067 |
| 2018/0136633 | A1* | 5/2018 | Small | G06Q 20/389 |
| 2020/0027096 | A1* | 1/2020 | Cooner | G06Q 40/04 |
| 2020/0151291 | A1* | 5/2020 | Bhattacharyya | G01C 21/20 |
| 2020/0401743 | A1* | 12/2020 | Bhattacharyya | G01C 21/203 |
| 2021/0208576 | A1* | 7/2021 | Muenzel | G05B 19/0426 |
| 2021/0366586 | A1* | 11/2021 | Ryan | G06Q 20/389 |
| 2023/0237349 | A1* | 7/2023 | Donoho | G06Q 50/26 |
| | | | | 706/46 |

OTHER PUBLICATIONS

Schroeder Greyce et al: "Visualising the digital twin using web services andaugmented reality", 2016 IEEE 14th International Conference Onindustrial Informatics (INDIN), IEEE, pp. 522-527, XP033043916,DOI: 10.1109/INDIN.2016.7819217; [gefunden am Jan. 13, 2017]; pp. 522-527.

* cited by examiner

AUTOMATIC SETUP OF DIGITAL TWINS FOR INDUSTRIAL CONTROLLERS

CROSS-REFERENCE TO RELATED APPLICATIONS

This application is a national phase filing under 35 U.S.C. § 371 of International Patent Application No. PCT/US2018/047733, filed Aug. 23, 2018 which is incorporated herein by reference in its entirety.

TECHNICAL FIELD

This application relates to industrial systems. More particularly, this application relates to digital simulation and control of industrial systems.

BACKGROUND

Digital Twins of products and production systems (factories) are a well-known concept and used increasingly. However, the engineer responsible for the system is tasked with determining an integrated, automated way to set up the digital twin. Digital twins may be associated with industrial controllers like programmable logic controllers (PLCs), numeric controllers for computer numerical control (CNC) machines and robotic controllers and may extend to other applications. Almost any physical device or system may be represented or emulated in a computer-based system. Presently, there is no established way to create digital twins for controllers or other devices and custom programming is required. The digital twin provides a virtual version of the physical system requiring deep knowledge of the device being simulated and knowledge of software development techniques for simulating characteristics of the physical device. The digital twin is hosted on a computer system via one or more software components. Each time a digital twin is created, a significant amount of effort is expended to create the digital twin and to integrate the digital twin into a physical system. Systems and methods to automate the process of establishing and configuring a digital twin are therefore desired.

SUMMARY

A method for implementing a digital twin for a physical component of an industrial system includes assigning a unique identifier to the physical component, associating the unique identifier with a digital twin representative of the physical component, placing the digital twin of the physical component on a distributed network. The physical component sends the unique identifier to a known resource, which retrieves the network address of the digital twin associated with the unique identifier and provides the network address to the physical component. A secure communication connection is established between the physical component and the corresponding digital twin via the distributed network. The unique identifier may be a quick read (QR) code displayed on the physical component or a bar code displayed on the physical component. According to embodiments, engineering software for the digital twin may be supplied on the distributed network. The digital twin can and will exist before the physical component is delivered to the customer, maybe even before the physical component is manufactured. As soon as the digital twin is created, its unique id can be communicated to the customer, e.g. with the order confirmation, and the customer can start using the digital twin with the engineering and simulation software associated with the digital twin.

In a memory in communication with the distributed network configuration data relating to the physical component and the digital twin is stored. The configuration data is updated when a change occurs to the configuration of the physical component. In a second memory in communication with the distributed network, version history of the configuration data relating to the physical component and the digital twin is stored for later reference. The digital twin may be placed on the distributed network by the original equipment manufacturer (OEM) who creates the physical component. The OEM creates the digital twin to possess the attributes of the physical component as manufactured. The secured communications between the physical component and the digital twin may be implemented using trust certificates associated with the physical component and the digital twin or using encrypted communications between the physical component and the digital twin. During operation the data between the physical component and the digital twin may be synchronized. Runtime data generated by the physical component may be recorded and stored on the distributed network with the digital twin. Additionally, version information corresponding to configuration changes in the digital twin or the physical component may be stored in memory for later reference. In some embodiments, a simulation may be run using the digital twin in context of the industrial system and the configuration of the physical component may be updated based on the simulation results.

According to aspects of embodiments described herein, a method for simulating operation of a component in an industrial system includes creating a digital twin of the component during manufacture of the component, placing the digital twin of the component on a distributed network, connecting the industrial system to the distributed network, transferring runtime data from the industrial system to a memory in communication with the distributed network, running a simulation of the component via the digital twin using the runtime data, producing simulation data indicative of operation of the industrial system using the digital twin and providing the simulation data to a user of the industrial system. The simulation may be run prior to the component being commissioned in the industrial system. Configuration data changes corresponding to the digital twin may be used to generate updated simulation data based on the changed configuration and the updated simulation data may be stored in memory. Multiple instances of stored simulation data corresponding to configurations of the digital twin may be stored in memory. In some embodiments, real-time operations data from the industrial system during operation is captured and communicated to the digital twin and the real-time data is synchronized with simulation data.

According to a system for implementation of a digital twin for a component in an industrial system includes a distributed network, a memory in communication with the distributed network, a computer processor in communication with the memory and the distributed network, a digital twin representative of the component, the digital twin being created by the original equipment manufacture of the component and stored in the memory, and a secure communication channel connecting the industrial system and the digital twin stored on the distributed network configured to communicate configuration or operations data between the industrial system and the digital twin.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Figure 1:
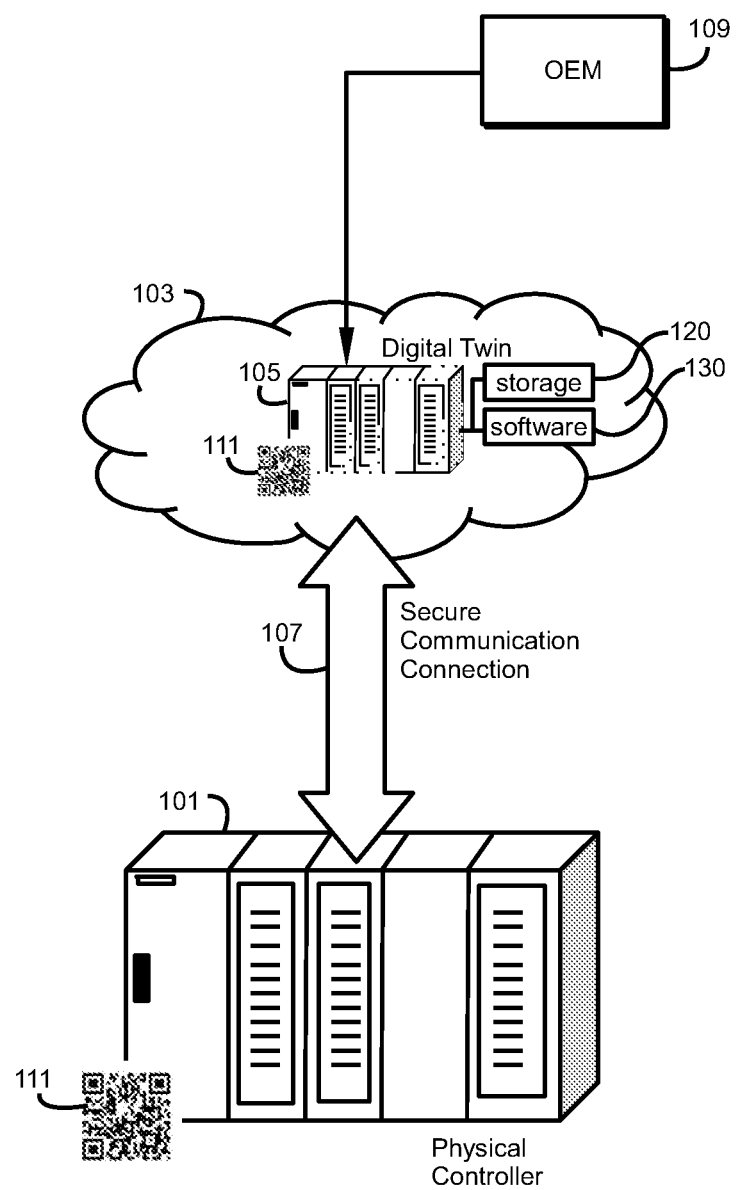
FIG. 1 is a schematic diagram of a system for establishing and configuring a digital twin according to aspects of embodiments of this disclosure.

A digital twin is a virtual replica of a physical object or system. Software is developed that simulates the operation and actions of the device or system. For example, input values may be presented to a device or component in the physical world and the component will react or process the inputs to produce an action or output. A digital twin is configured to receive the input values that would be provided to the component in the physical realm and through computer processing, create the same output actions or values that would be produced by the physical device. In order for a digital twin to be useful, the digital twin must faithfully reproduce the actions of the physical component. The digital twin must therefore be capable of simulating the receiving of inputs and delivery of outputs as would be expected from the physical device. The digital twin may be placed in communication with a physical system. The physical system may then provide the digital twin with various inputs. The digital twin receives the inputs and performs processes to create outputs in the form of intermediate processing values or signals or instructions to spawn various actions. If the digital twin is connected to the physical system, the outputs may be provided to physical components that are downstream in the process from the digital twin. This allows the user to monitor the overall system to see how the system functions using the digital twin without the actual component being present or active in the system.

For example, a new configuration or setting for a component may be implemented in a digital twin. The system can perform operations while interacting with the updated digital twin. In this manner, the effect of the configuration change may be observed without changing the actual component. If the changes do not provide the desired result, the original configuration of the physical device is not changed. If the changes produce desired result, the physical device can be re-configured according to the changes represented in the digital twin.

Similarly, a new component of a system may be purchased from the manufacturer. Prior to delivery of the new component, a digital twin of the new component may be placed in communication with the existing system. Simulated operations of the plant may be performed using the digital twin. This allows the new component to be configured and adjusted for optimal performance and will be optimized prior to the time the physical component is installed.

Clearly, the creation of a reliable digital twin requires a considerable amount of knowledge and effort to produce software components that capture the nature and behavior of its physical counterpart. Knowledge of the engineering of the component must be possessed and the behaviors of the component must be well understood and simulated in virtual processes. Additionally, communications must be established between the digital twin and the physical system. This requires knowledge and resources to establish communications that are reliable and secure. This is further complicated by the fact that both engineering data and real-time production data are transferred between the digital twin and the system. Typically, these different types of data are transported across the network at different layers, requiring knowledge of all layers to implement these communications. Further, cyber-security is vital to modern industrial systems and introduces additional expertise needed to implement digital twins safely into production systems.

As stated above, the creation of the digital twin requires set up of simulation software for the component, such as an industrial controller, on a computer system. This computer system can reside locally on premises with the system or in a network such as the cloud. Additionally, it requires the installation of one or more engineering software packages to configure and program the digital twin representing the simulated controller. Embodiments described in this disclosure provide the following benefits and abilities while reducing or eliminating the need for manual intervention implementing a digital twin.

The communication between the physical controller and its digital twin must be configured and tested. It involves more than one application layer communication style, because exchanging engineering data and exchanging runtime data usually are generally handled differently, using different application protocols. Further, the communication must be secure by using encryption and other measures;

Synchronization of the twins regarding configuration and program in both directions;

Recording of all accesses to the physical system and secure storage of this information in the digital twin;

Allowing of use of the digital twin of the controller before the physical controller is installed;

Safe storage of each deployed version of configuration and program;

Pre-configured recording runtime data of the physical system in the digital twin.

Methods and systems according to the embodiments described herein solve the technical problem of setting up a digital twin for each industrial controller or other component while requiring minimal effort of the buyer/user of the controller. According to embodiments the following steps for setting up the digital twin will be fully automated:

Creation of a digital twin of the controller or component in cyberspace (e.g. cloud) once ordered, the digital twin is created concurrently with manufacture and can be used for engineering and simulation before the physical controller exists;

Automatic establishment of secure communication between physical controller and its digital twin;

Synchronization of the twins with the physical system regarding configuration and program in both directions;

Recording of all accesses to the physical system in the digital twin for audit purposes;

Allowing of use of the digital twin of the controller before the physical controller is installed in the factory for configuration, programming, simulation, testing etc.;

Safe storage of each deployed version of configuration and program in the digital twin; and Recording runtime data of the physical system in the digital twin.

FIG. 1 is a schematic diagram of a physical controller 101 and its digital twin 105 according to embodiments of this disclosure. A cloud network 103 provides communication between a plurality of computers or computer systems. The cloud network 103 may interconnect multiple sub-networks and may further include memory resources associated with computers or sub-systems connected to the cloud network 103. An original equipment manufacturer (OEM) 109 produces and sells a physical controller 101. The physical controller 101 may be a programmable logic controller (PLC) for controlling equipment in an industrial system. The physical controller 101 may receive inputs from components in the industrial system or from sensors associated with these components. Based on the received inputs, the physical controller 101 may perform logic operations based on defined rules programmed into the controller and applies the rules to the received inputs. The logic operations produce outputs that may include intermediate calculations for other logic operations or may embody signals used to operate various system components including but not limited to switches, valves or actuators.

Figure 2:
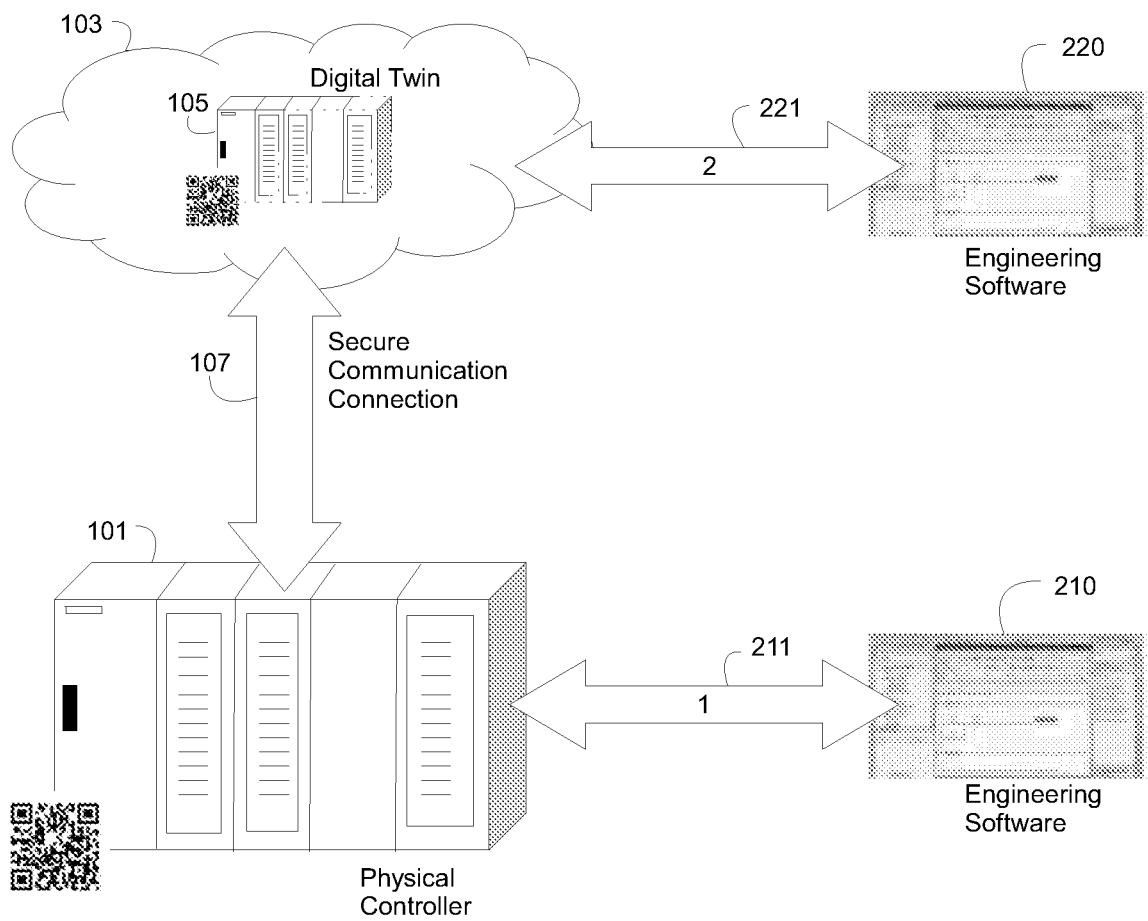
FIG. 2 is a schematic diagram of a system for establishing and configuring a digital twin according to aspects of embodiments of this disclosure.

For each physical controller 101 produced (and sold), the OEM 109 creates a digital twin 105 in the cloud network 103. When creating each digital twin 105 each physical controller 101 has a unique serial number, or other way of uniquely identifying each produced piece, for example a QR code label 111 may encode information to identify the physical controller 101. The instance of the controller's digital twin 105 will be labeled and addressed with the same unique identifier 111 as the physical controller 101. The digital twin 105 is created in the cloud network 103 with the exact same features as the physical controller 101 as ordered from the OEM 109. For example, features that may be reflected in the digital twin 105 include memory size, memory type, number of input/output (I/O) modules, and any other extension of the system ordered together with the physical controller 101. The digital twin 105 of the physical controller 101 is mainly an emulation of the physical controller 101 plus a versioned storage 120 for the controller's 101 configuration/program. Additionally, it can optionally contain a cloud-based version of the engineering software (as shown in FIG. 2) for this type of controller, and some simulation software 130 for simulating the process interacting with the controller, and engineering software to configure the process simulation software. The simulation software 130 and engineering software (FIG. 2, 220) may be used prior to the physical controller 101 being installed on site. To access the digital twin prior to installation of the physical controller 101, the unique identifier associated with the digital twin may be provided to the user by conventional means, such as on paper or by electronic communications such as e-mail.

When the physical controller 101 is installed in the field and turned on, it checks to see whether the physical controller 101 can connect to the Internet. If the Internet connection exists, the physical controller 101 establishes a communication line 107 with its digital twin 105 in a two-step procedure. First it will send a secure hypertext transfer protocol (https) request to a well-known universal resource identifier (URI), passing on its own unique identifier 111. The communication must be additionally hardened (e.g., by using unique certificates) so that both sides know they can trust each other, and neither side can reasonably fake its identity. Once authenticated, the server associated with the well-known URI then discloses the address of the controller's digital twin 105 to the physical controller 101. The physical controller 101 stores the address of the digital twin 105 in memory for future use. In the second step, the physical controller 101 creates a secure communication 107, again using unique certificates on both sides with its digital twin 105 using the address it stored from step 1. At the end of this procedure, the physical controller 101 and its digital twin 105 can communicate securely without any manual configuration required on either side.

Referring now to FIG. 2, to aid in engineering an industrial controller 101, the vendor typically provides an engineering software package 210. The engineering software 210 can be embedded in the controller 101 and used via a web interface. In other embodiments, the engineering software 210 can be installed on the user's PC or can be web-based cloud software. Any change made with the engineering software 210 directly in the controller 101 is synchronized 211 with the digital twin 105 of the controller 101 and stored in the digital twin 105 as the current configuration/program of the controller 101. In addition, each hardware change in the physical controller 101, like adding/removing an I/O module, is registered and the change is propagated to the digital twin 105. The user can also connect a copy of the engineering software 220 to the digital twin 105 of the controller directly. In that case, any changes the user makes to configuration and program is not automatically transferred to the physical controller 101. Instead the user is required to initiate the transfer, for example through a secure communication connection 107, because the proposed changes could be potentially dangerous to the physical controller 101 if installed without prior testing or simulation.

Using the existing communication connection 107 between physical controller 101 and its digital twin 105, all accesses to the controller 101 are recorded and an audit trail stored in the digital twin 105. The digital twin 105 of the controller 101 may be created by the OEM and exist before the hardware of the controller 101 is even delivered to the customer/user. The controller vendor can disclose the access information to the digital twin 105 to the customer early in the purchasing process and the customer is able to start configuration, programming, testing, and simulating of the controller 101 without having to wait for the delivery of the physical controller 101. The cloud image of the digital twin 105 can also contain a versioned storage for the configuration/program of the controller 101 and therefore will not lose any changes the user made. This is important if the user must go back to a previous version, for example because of newly introduced bugs in the controller program. When the physical controller 101 is fully commissioned and controlling the process, it will produce data at real-time speeds, which is transferred to the digital twin 105 and stored in the digital twin 105 for further recollection and evaluation.

The automatic provisioning of a digital twin 105 for each sold industrial controller 101 provides features to the user which were while technically feasible in the past, were not performed due to the high engineering effort or lack of knowledge on the user's side regarding how to setup a digital twin 105 with the many features automated by embodiments of the present invention. Additionally, the digital twin 105 is created before the physical controller 101.

Because the digital twin exists before the physical counterpart, it is possible to begin engineering and simulating before the physical controller 101 is received and installed in the plant.

In this way, embodiments of the present invention represent an improvement of the prior systems for implementing digital twins. For example, leveraging the intimate knowledge of the modeled component possessed only by the manufacturer. The OEM will also have first hand knowledge of the specific configuration of a component ordered by the customer and can closely match the operation of the component exactly as ordered. Prior art systems required the end user to gain the knowledge of the configuration and operation of the component through independent means. Furthermore, simulation and configuration of the component may be performed before the component is physically delivered and commissioned in the plant. The digital twin may be used to simulate the interaction of the component in the industrial system and a proposed configuration may be tested and optimized. When the physical component is delivered, the optimized configuration settings may be downloaded from the digital twin through the cloud network. What's more, run-time data and configuration versioning of the physical component may be offloaded and stored in the digital twin to provide a history of past configurations and allow for a rollback version of the component in case of failure or a programming error.

Figure 3:
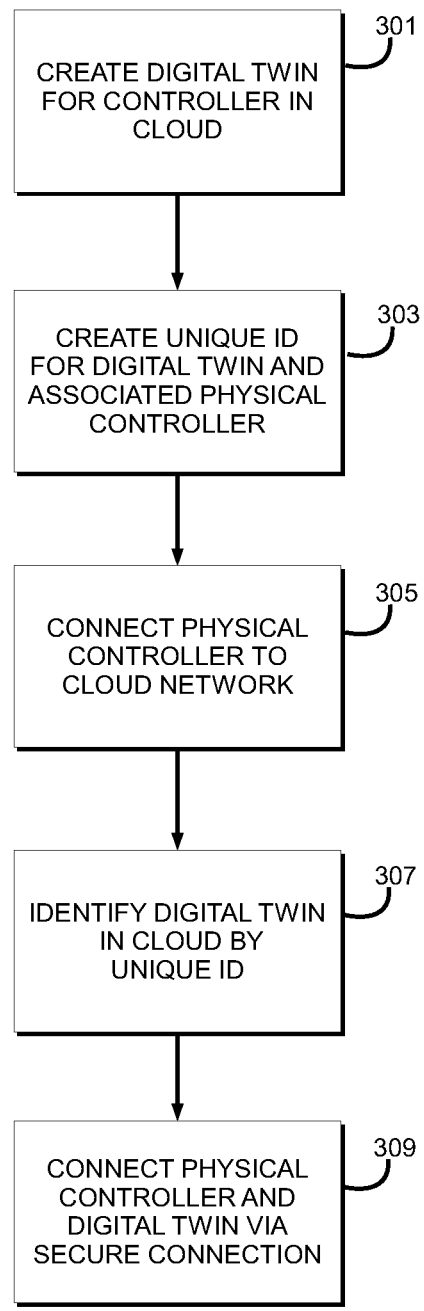
FIG. 3 is a process flow diagram for a method for establishing and configuring a digital twin according to aspects of embodiments of this disclosure.

FIG. 3 is a process flow diagram of a method for automatically associating a digital twin with a corresponding physical component according to aspects of embodiments described in this disclosure. As an initial step, the OEM creates a digital twin that simulates and behaves like a physical component manufactured by the OEM. The digital twin is configured to behave and simulate the operation of the component and includes each feature included in the manufactured component. The digital twin is created and is placed in a cloud network 301 at a specified address. The digital twin may be engineered and simulated from the cloud prior to manufacture of the physical component. A unique identifier associated with the digital twin is also assigned to the physical component, such as an industrial controller 303.

When the physical component (e.g., controller) is commissioned, it is connected to a computer network in communication with the cloud network hosting the digital twin 305. The unique identifier of the physical component is matched with the corresponding unique identifier associated with the digital twin 307. A secure communications connection is then established between the physical component and its corresponding digital twin 309.

Figure 4:
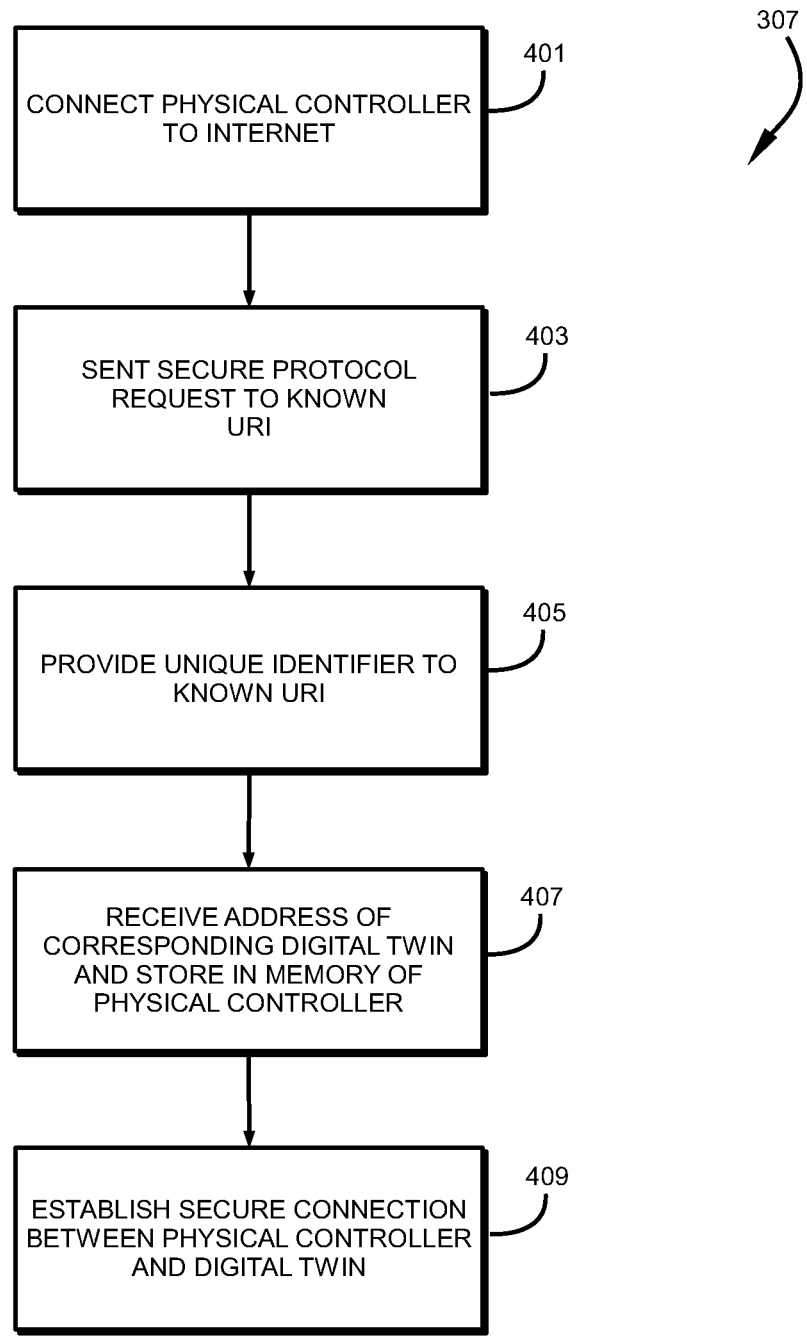
FIG. 4 is a process of associating a physical controller with it's corresponding digital twin according to aspects of embodiments of this disclosure.

FIG. 4 is a process flow diagram of a method of associating a physical component with its corresponding digital twin stored in a cloud network according to aspects of embodiments described in this disclosure. When the physical component is commissioned and connected to the local network, the component or controller is connected through the local network to the Internet 401. Once a connection to the Internet is established, a secure hypertext transfer protocol request is presented to a known URI on the Internet 403. The physical component provides a unique identifier associated with the component to the known URI 405. The unique identifier associated with the physical component is further associated with a digital twin that was provided by the OEM of the physical component and associated with the digital twin placed on a cloud network. The URI receives the unique identifier from the physical component and locates the corresponding digital twin using the unique identifier. When the digital twin is found, the network address where the digital twin is located is provided by the URI and received by the physical component 407. The physical component stores the address of its digital twin in memory and establishes a secure connection between the physical component and its corresponding digital twin 409. A secure communication connection may be performed by any secured communication technique including but not limited to trusted domains, certificates, virtual private networks (VPNs), firewalls or encrypted communications.

Figure 5:
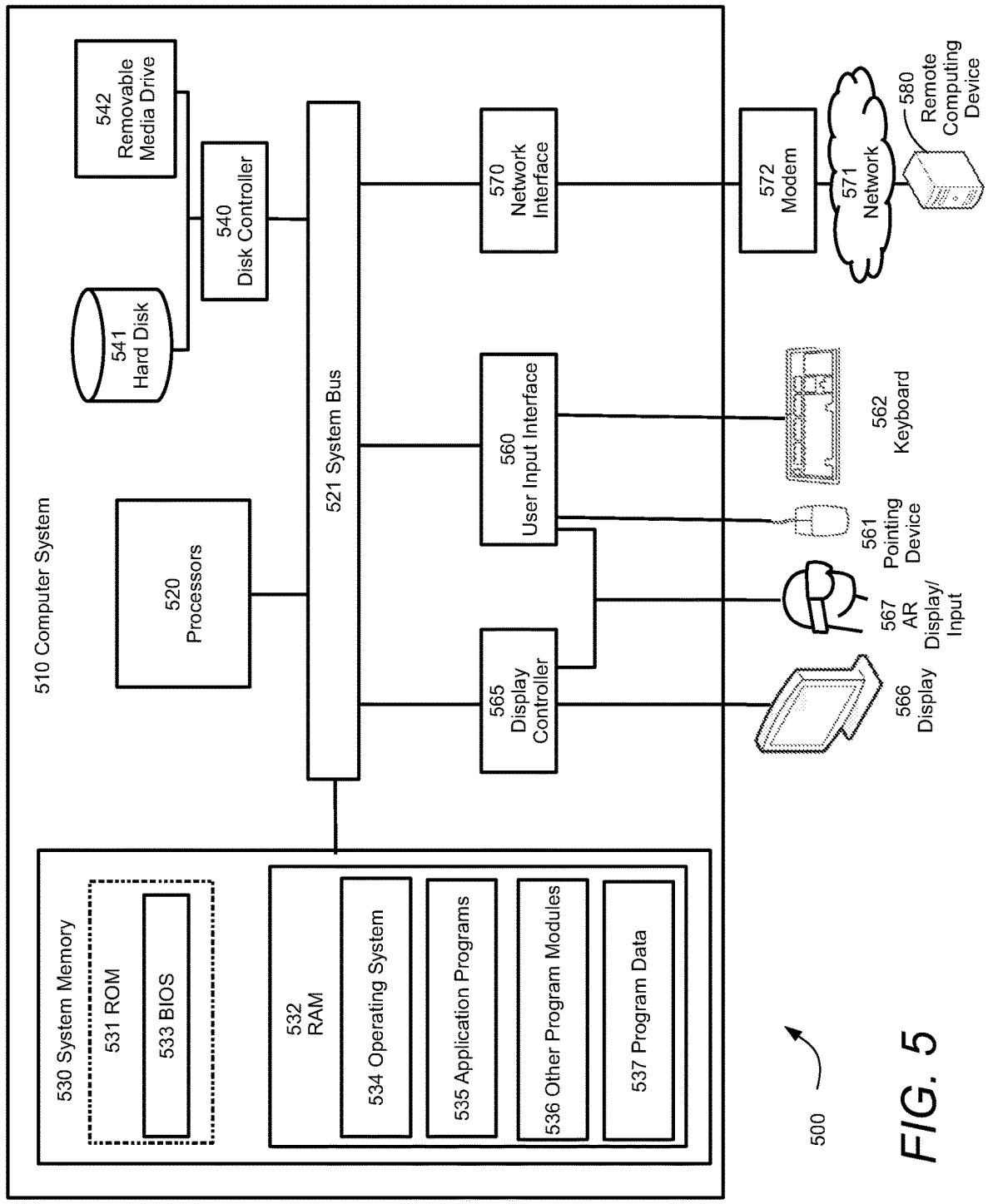
FIG. 5 is a schematic diagram of a computer system for implementing some aspects of embodiments of this disclosure.

FIG. 5 illustrates an exemplary computing environment 500 within which embodiments of the invention may be implemented. Computers and computing environments, such as computer system 510 and computing environment 500, are known to those of skill in the art and thus are described briefly here.

As shown in FIG. 5, the computer system 510 may include a communication mechanism such as a system bus 521 or other communication mechanism for communicating information within the computer system 510. The computer system 510 further includes one or more processors 520 coupled with the system bus 521 for processing the information.

The processors 520 may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general-purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Continuing with reference to FIG. 5, the computer system 510 also includes a system memory 530 coupled to the system bus 521 for storing information and instructions to be executed by processors 520. The system memory 530 may include computer readable storage media in the form of volatile and/or nonvolatile memory, such as read only memory (ROM) 531 and/or random-access memory (RAM) 532. The RAM 532 may include other dynamic storage device(s) (e.g., dynamic RAM, static RAM, and synchronous DRAM). The ROM 531 may include other static storage device(s) (e.g., programmable ROM, erasable PROM, and electrically erasable PROM). In addition, the system memory 530 may be used for storing temporary variables or other intermediate information during the execution of instructions by the processors 520. A basic input/output system 533 (BIOS) containing the basic routines that help to transfer information between elements within computer system 510, such as during start-up, may be stored in the ROM 531. RAM 532 may contain data and/or program modules that are immediately accessible to and/or presently being operated on by the processors 520. System memory 530 may additionally include, for example, operating system 534, application programs 535, other program modules 536 and program data 537.

The computer system 510 also includes a disk controller 540 coupled to the system bus 521 to control one or more storage devices for storing information and instructions, such as a magnetic hard disk 541 and a removable media drive 542 (e.g., floppy disk drive, compact disc drive, tape drive, and/or solid-state drive). Storage devices may be added to the computer system 510 using an appropriate device interface (e.g., a small computer system interface (SCSI), integrated device electronics (IDE), Universal Serial Bus (USB), or FireWire).

The computer system 510 may also include a display controller 565 coupled to the system bus 521 to control a display or monitor 566, such as a cathode ray tube (CRT) or liquid crystal display (LCD), for displaying information to a computer user. The computer system includes an input interface 560 and one or more input devices, such as a keyboard 562 and a pointing device 561, for interacting with a computer user and providing information to the processors 520. The pointing device 561, for example, may be a mouse, a light pen, a trackball, or a pointing stick for communicating direction information and command selections to the processors 520 and for controlling cursor movement on the display 566. The display 566 may provide a touch screen interface which allows input to supplement or replace the communication of direction information and command selections by the pointing device 561. In some embodiments, an augmented reality device 567 that is wearable by a user, may provide input/output functionality allowing a user to interact with both a physical and virtual world. The augmented reality device 567 is in communication with the display controller 565 and the user input interface 560 allowing a user to interact with virtual items generated in the augmented reality device 567 by the display controller 565. The user may also provide gestures that are detected by the augmented reality device 567 and transmitted to the user input interface 560 as input signals.

The computer system 510 may perform a portion or all of the processing steps of embodiments of the invention in response to the processors 520 executing one or more sequences of one or more instructions contained in a memory, such as the system memory 530. Such instructions may be read into the system memory 530 from another computer readable medium, such as a magnetic hard disk 541 or a removable media drive 542. The magnetic hard disk 541 may contain one or more datastores and data files used by embodiments of the present invention. Datastore contents and data files may be encrypted to improve security. The processors 520 may also be employed in a multi-processing arrangement to execute the one or more sequences of instructions contained in system memory 530. In alternative embodiments, hard-wired circuitry may be used in place of or in combination with software instructions. Thus, embodiments are not limited to any specific combination of hardware circuitry and software.

As stated above, the computer system 510 may include at least one computer readable medium or memory for holding instructions programmed according to embodiments of the invention and for containing data structures, tables, records, or other data described herein. The term "computer readable medium" as used herein refers to any medium that participates in providing instructions to the processors 520 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 541 or removable media drive 542. Non-limiting examples of volatile media include dynamic memory, such as system memory 530. Non-limiting examples of transmission media include coaxial cables, copper wire, and fiber optics, including the wires that make up the system bus 521. Transmission media may also take the form of acoustic or light waves, such as those generated during radio wave and infrared data communications.

The computing environment 500 may further include the computer system 510 operating in a networked environment using logical connections to one or more remote computers, such as remote computing device 580. Remote computing device 580 may be a personal computer (laptop or desktop), a mobile device, a server, a router, a network PC, a peer device or other common network node, and typically includes many or all of the elements described above relative to computer system 510. When used in a networking environment, computer system 510 may include modem 572 for establishing communications over a network 571, such as the Internet. Modem 572 may be connected to system bus 521 via user network interface 570, or via another appropriate mechanism.

Network 571 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 510 and other computers (e.g., remote computing device 580). The network 571 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 571.

An executable application, as used herein, comprises code or machine-readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof.

What is claimed is:

1. A method for implementing a digital twin representative of a physical component of an industrial system comprising:
    associating a unique identifier with the physical component and the digital twin representative of the physical component;
    placing the digital twin representative of the physical component on a distributed network;
    connecting the physical component to the distributed network;
    accessing, by the physical component, a uniform resource identifier corresponding to the unique identifier to the distributed network by the user;
    retrieving the network address of the digital twin associated with the unique identifier and providing the network address to the physical component; and
    establishing a secure communication connection between the physical component and the digital twin representative of the physical component via the distributed network.

2. The method of claim 1, wherein the unique identifier comprises a quick read (QR) code displayed on the physical component.

3. The method of claim 1, wherein the unique identifier comprises a bar code displayed on the physical component.

4. The method of claim 1 further comprising:
    supplying engineering software for the digital twin on the distributed network.

5. The method of claim 1 further comprising:
    in a memory in communication with the distributed network, storing configuration data relating to the physical component and the digital twin.

6. The method of claim 5, further comprising:
    updating the configuration data when a change occurs to the configuration of the physical component.

7. The method of claim 5, further comprising:
    in a second memory in communication with the distributed network, storing version history of the configuration data relating to the physical component and the digital twin.

8. The method of claim 1, wherein the digital twin is placed on the distributed network by an original equipment manufacturer (OEM).

9. The method of claim 1 further comprising:
    developing the digital twin to have the same features as the physical component as the physical component is manufactured.

10. The method of claim 1, further comprising:
    securing the secure communications connection using trust certificates associated with the physical component and the digital twin.

11. The method of claim 1 further comprising:
    securing the secure communications connection using encrypted communications between the physical component and the digital twin.

12. The method of claim 1, further comprising:
    synchronizing operation data created by the physical component with the digital twin.

13. The method of claim 1, further comprising:
    recording runtime data created by the physical component during operation of the physical component; and
    in a memory in communication with the distributed network, storing the runtime data created by the physical component.

14. The method of claim 1, further comprising:
    running a simulation of the industrial system using the digital twin; and
    updating a configuration of the physical component based on results of the simulation.

* * * * *